Patented Aug. 3, 1937

2,088,898

UNITED STATES PATENT OFFICE 2,088,898

LUBRICATING OIL

Ferdinand W. Breth, Petrolia, Pa., assignor, by mesne assignments, to Standard Oil Development Company No Drawing. Application October 2, 1934, Serial No. 746,509

3 Claims. (Cl. 87—9)

This invention relates to improved lubricating oils, and especially to improved lubricating oils having a low pour point, and is a continuation of my copending application, Process of reducing pour point of lubricating oils, Serial No. 593,692, filed February 17, 1932.

The invention is applicable to the reduction of the pour point of a lubricating oil, and especially to a petroleum lubricating oil containing in solution, paraffin, or substances of a waxy nature, such as stearic acid. Such materials may occur naturally in the oil, or may be added, and normally have a tendency to precipitate when the oil is cooled, thereby causing the oil to set or gel and causing the oil to flow sluggishly or not at all. Lubricating oils derived entirely or principally from so-called Pennsylvania crude oil belong generally to the classes mentioned, although the invention is applicable to waxy oils from any source whatever.

The first step consists in the preparation of the material by means of which the pour point of the lubricating oil is reduced, in other words the pour depressor, and consists in the preparation of a modified oil by application of an electrical silent discharge. The raw materials may be obtained from animal oil, vegetable oil, marine oil, mineral oil, etc., and are contained in the general class of organic materials which have relatively long principally straight hydrocarbon chains, of, for example, 10 or 12 carbon atoms or more.

The modification or polymerization of these materials, by subjecting the same to an electrical silent discharge, has been practiced for other purposes and does not, per se, constitute my invention. The method is described in German Patent No. 234,543, issued May 13, 1911, and is described in various articles, appearing in the literature as the Voltol process.

The polymers which I desire to form have a molecular weight in excess of 600, and up to 2000 or higher. The lower polymers do not possess the desired pour depressing properties, but it is extremely difficult to separate fractions closely and to state exactly at just what point this pour inhibiting action begins.

At least a portion of the oil subjected to treatment is modified to compounds of higher molecular weight and viscosity than the oil treated. The treated materials may be added as such, or the modified material may be separated from the unmodified. In any case, the degree of modification must be such as to impart a potency sufficient to accomplish the desired results. The percentage of modified material in any batch of oil treated is apparently small and can be concentrated by means of vacuum distillation, as a large part of the unmodified material may be removed from the admixture with the modified material because of its relatively lower boiling point, but there is reason to believe that the depressor is not isolated and the distillation residue may still contain a substantial amount of inactive portion. Among the various uses to which this modified oil has heretofore been applied is that of addition agent in large amounts to low grade lubricating oils which manifest an unsatisfactory viscosity-temperature curve, and which at the same time are wax free, for the purpose of increasing the oiliness and the viscosity of the oil. In the present invention, however, very small amounts of the voltol are used.

In the application of my process, the modified oil so prepared is added to the lubricating oil having an undesirably high pour point. As is well known, such oils are not solvents for water and do not normally contain any substantial amount of water. The amount of modified material added is sufficient to reduce the pour point to within satisfactory limits. In the preferred application of my process, the modified oil is added to a lubricating oil derived from any waxy oil, such as, for example, Pennsylvania crude oil. Such lubricating oils containing the waxy substance have normally a satisfactory viscosity-temperature curve but not infrequently manifest an unsatisfactory pour point. The application of the modified material hereinabove described to such oil, and particularly in the amounts requisite to effect the desired modification of pour point, is believed to be entirely novel and constitutes the subject matter of my invention. Low viscosity lubricating oils find a wide use today, especially as winter oils, and the modified material can be used with such oils with excellent results, greatly reducing their pour point without excessive increase of viscosity. In carrying out my process I may, for example, add sufficient modified material of sufficient potency to an oil having a pour test of 35° F. or higher to reduce the pour test to 10° F. or lower.

As previously stated, the invention is applicable only to those oils containing paraffin or waxy substances in liquid solution which manifest a tendency to gel or set on cooling due to the precipitation of the paraffin or waxy materials.

The amount of the modified oil to be added to the waxy lubricating oils depends on many factors and it is best determined by simple routine test on the particular samples of modified oil and waxy lubricating oil. It has been found, for example, that different starting materials under similar treatment give products of decidedly different potency and different oils show different degrees of susceptibility to the same depressor. For example, it is generally necessary to add more of the given depressor to a more viscous oil than to a less viscous oil to obtain an equivalent pour depression. Even oils of the same viscosity but derived from different sources or finished by different methods show different susceptibilities. The current density, frequency and voltage of the electrical discharge may also influence the modification.

Furthermore, as indicated above, it is only certain of the heavier fractions of the modified oil which possess the pour depressing property, and these particular fractions cannot be isolated so that it is extremely difficult to specify exactly the amount of the active material added. If the oil is subjected to the voltolization treatment for several hours, the content of the active substance is quite small and naturally a larger proportion of the whole product from the voltolizing chamber would have to be added than in the case where more completely voltolized material, for example, one treated for several days, is used. Generally voltolization is carried out as long as possible just avoiding the precipitation of insoluble or gummy materials, and where a material is so prepared and added to the oil in toto the amount may vary from, say, ½ to 5% or more, but if a concentrated product, for example, the residue obtained by vacuum distillation, be used it is sufficient to add considerably less, for example, from .2 to 3%. Under such conditions even though the inhibitor itself is a very viscous product it may be used in such amounts as not to increase the viscosity of the oil to which it is added by any substantial amount. For example, ordinarily the increase may be from 1 to 2 or 3 seconds Saybolt at 210° F., or may be limited to, say, an increase of 5 seconds or 10 seconds at 210° F., and at the same time obtain a very substantial reduction of the pour point. It is possible, of course, to use larger amounts of the material where there is no great objection to increasing viscosity, but in many cases increasing the amount of the depressor does not produce an equivalent pour point depression. In using low viscosity winter oils, for example, S. A. E. grade 10W which has a viscosity of 5,000 to 10,000 sec. Saybolt at 0° F. and 90 to 115 sec. Saybolt at 130° F., it is very important to obtain a large pour point depression with a minimum viscosity increase. In general, therefore, it may be said that the amount of the pour inhibitor to be added depends on various factors. In general it will fall between the limits of 1/16 and 5% or even 10% more or less, and the most effective amount for the purpose in hand may be determined by routine test, making up samples of the particular oil and the particular depressor.

Two different types of voltol, differing only in the relative proportions of mineral oil to vegetable oil, were obtained from the raw material by electrical treatment; one a Belgian voltol sold under the trade name of "Electrion" and a second, German voltol, designated "End voltol". The physical characteristics of these two products, are as follows:—

|  | Electrion | End voltol |
|---|---|---|
| Gravity at 60° F. | 23.1 A. P. I. | 18.3 A. P. I. |
| Vis. Saybolt 210° F. | 733 sec. | 975 sec. |
| Pour test | 40° F. | 15° F. |
| Flash point | 410° F. | 400° F. |
| Fire point | 465° F. | 445° F. |
| Color (Lovibond ½ in. cells) | 20 yellow 5 red | 20 yellow 14 red. |
| Acidity | 0.63 mg. KOH |  |
| Alkalinity | 0.47 |  |
| Iodine value | 35.2 | 17.8. |
| Saponification No. | 74.7 | 10.0. |
| Ash | 0.039% |  |

The following examples illustrate the effects of small amounts of End voltol upon a Pennsylvania waxy lubricating oil having the following properties:—

Specific gravity at 60° F. _____ 28.0° A. P. I.
Viscosity (Say.) at 210° F. _____ 79 sec.
Flash point _____ 450° F.
Fire point _____ 515° F.
Pour point _____ 30° F.
Color (Lovibond ½ in. cells) ___ 20 yellow 38 red.

Upon the addition of 0.5% of End voltol, the following mixture was obtained:—

Specific gravity at 60° F. _____ 28.0° A. P. I.
Viscosity (Say.) at 210° F. _____ 80 sec.
Flash point _____ 450° F.
Fire point _____ 515° F.
Pour point _____ 10° F.
Color (Lovibond ½ in. cells) ___ 20 yellow 38 red.

Upon the addition of 1.0% of End voltol, the following mixture was obtained:—

Specific gravity at 60° F. _____ 27.9° A. P. I.
Viscosity (Say.) at 210° F. _____ 82 sec.
Flash point _____ 445° F.
Fire point _____ 505° F.
Pour point _____ —7° F.
Color (Lovibond ½ in. cells) ___ 20 yellow 38 red.

From the above, it can be seen that the physical properties of the lubricating oil and the lubricating oil-voltol mixture are substantially the same, with the exception of the pour point, which is appreciably lower in the mixture.

I believe the effect in waxy oils to be due to the fact that as soon as microscopic crystals of paraffin are formed by cooling, the modified material is adsorbed on the surface of the crystals, thereby operating to inhibit the formation of large crystals which would seriously affect the pour point of the oil and thereby operating to hold the paraffin in a state of colloidal suspension. I do not wish however, to be limited by this statement of theory, but only by the appended claims wherein I have endeavored to claim broadly a lubricating oil containing voltol in amount and potency adapted to lower the normal pour point of the lubricating oil.

By the term "voltol" as used in the claims, I mean a product obtained by subjecting a normally liquid oil to an electrical silent discharge, whereby a substantial degree of polymerization occurs.

I claim:—

1. A lubricating oil composition substantially water free and fluid at ordinary temperatures, comprising principally a petroleum lubricating oil distillate having normally a pour point in excess of 15° F. caused by wax therein, said composition containing a polymerized oil from 0.2 to 5% in amount and potency sufficient to reduce the normal pour point of said lubricating oil distillate, said polymerized oil being produced by the action of a silent electrical discharge.

2. A lubricating oil composition substantially water free and fluid at ordinary temperatures, comprising principally a petroleum lubricating oil distillate having normally a pour point in excess of 15° F. caused by wax therein, said composition containing a polymerized oil from 0.2 to 3% in amount and potency sufficient to reduce the normal pour point of said lubricating oil distillate at least 10° F., said polymerized oil being produced by the action of a silent electrical discharge.

3. A lubricating oil composition substantially water free and fluid at ordinary temperatures, comprising principally a petroleum lubricating oil having normally a pour point caused by wax therein, and voltol, in amount and potency sufficient to reduce the normal pour point of said lubricating oil at least 10° F. without substantial change in the viscosity of said oil.

FERDINAND W. BRETH.